(12) United States Patent
Leleve

(10) Patent No.: US 7,390,112 B2
(45) Date of Patent: Jun. 24, 2008

(54) FIXED LIGHT FOR BENDS FOR A MOTOR VEHICLE

(75) Inventor: Joel Leleve, Bobigny, Cedex (FR)

(73) Assignee: Valeo Vision, Bobigny Cedex (FR)

( * ) Notice: Subject to any disclaimer, the term of this patent is extended or adjusted under 35 U.S.C. 154(b) by 252 days.

(21) Appl. No.: 10/894,619

(22) Filed: Jul. 20, 2004

(65) Prior Publication Data
US 2005/0018436 A1    Jan. 27, 2005

(30) Foreign Application Priority Data
Jul. 24, 2003    (FR)    .................................. 03 09093

(51) Int. Cl.
*B60Q 1/04* (2006.01)

(52) U.S. Cl. ..................... 362/464; 362/466; 362/545

(58) Field of Classification Search ................. 362/464, 362/465, 466, 543, 544, 545; 315/81, 82
See application file for complete search history.

(56) References Cited

U.S. PATENT DOCUMENTS

| | | | |
|---|---|---|---|
| 6,176,590 B1 | 1/2001 | Prevost et al. | |
| 6,476,726 B1 * | 11/2002 | Pederson | 362/800 |
| 6,481,876 B2 * | 11/2002 | Hayami et al. | 362/466 |
| 6,698,911 B2 * | 3/2004 | Naganawa et al. | 362/464 |
| 6,997,587 B2 * | 2/2006 | Albou | 362/545 |
| 2001/0026457 A1 * | 10/2001 | Oyama et al. | 362/543 |
| 2004/0156211 A1 * | 8/2004 | Blusseau | 362/545 |
| 2004/0240217 A1 * | 12/2004 | Rice | 362/465 |

FOREIGN PATENT DOCUMENTS

| | | |
|---|---|---|
| DE | 19923198 | 11/2000 |
| EP | 0864462 | 9/1998 |
| FR | 2811621 | 1/2002 |
| GB | 178234 | 4/1922 |

* cited by examiner

*Primary Examiner*—Y M. Lee
(74) *Attorney, Agent, or Firm*—Morgan & Finnegan, LLP

(57) ABSTRACT

The fixed light for bends for a motor vehicle comprises at least two light sources, means sensitive to the path of the vehicle for supplying a signal dependent on the nature of the road followed by the vehicle, and means for controlling successive switching on the sources according to the signal delivered and providing an effect of light sweeping towards the inside of the bend. Each light source consists of one or more modules with light-emitting diodes.

9 Claims, 3 Drawing Sheets

FIXED LIGHT FOR BENDS FOR A MOTOR VEHICLE

FIELD OF THE INVENTION

The invention relates to a fixed headlight for bends for a motor vehicle.

BACKGROUND OF THE INVENTION

Such a light is provided for illuminating as well as possible towards the inside of the bend the portions of road which the vehicle will approach.

EP-A-0 864 462 proposes a lighting system comprising at least two lights of the fog type and means for controlling the supply power to the lights according to vehicle wheel turning information. These control means increase the supply power of only one light for bends which is on the side toward which the vehicle is turned, so as to accentuate the illumination on this side. Proportionality to the bend is thus obtained by modulating the intensity of the beam; the effect perceived by the driver may be considered to be a moderate service.

In order to obtain a more satisfactory effect, it is possible to provide a following of the bend by rotational driving of an optical system, which involves moving parts, actuators and control electronics, and therefore a high cost.

The aim of the invention is above all to provide a fixed light for bends which, whilst remaining of an acceptable cost, makes it possible to obtain an effect of following the bend.

SUMMARY OF THE INVENTION

According to the invention, a fixed light for bends for motor vehicles is characterized in that it comprises:
at least two light sources;
means sensitive to the path of the vehicle in order to supply a signal depending on the nature of the road followed by the vehicle;
and means for controlling successive switching on of the sources according to the signal delivered and to provide an effect of light sweeping, preferably but not limitingly towards the inside of the bend;
each light source advantageously consists of a light-emitting diode module.

The light preferably comprises at least four light sources able to be switched on successively in order to provide travel of the light beam and following of the bend.

The preceding source, in the order of switching on, can remain on when the following source is switched on. In a variant, the preceding source is switched off (totally or partially) when the following source is switched on.

It may also be a case of a group of several, at least two, of these modules. In this case, it is possible to have several groups of modules, each diode in a group being in the same state (off or on) as the other diodes in the said group.

The beams of the light sources preferably have an inclination to the longitudinal axis of the vehicle and/or a beam angle which cross over, in the order of switching on, so that a following light source illuminates more towards the inside of a bend than the previous source.

The optical axes of the light sources can be oriented more and more towards the inside of the bend. In a variant, the optical axes of the sources are parallel to each other, whilst being oriented towards the inside of the bend.

The beam angle of the light beam of the sources can be greater and greater towards the inside of the bend in the order of switching on of the sources.

The switching on of each light-emitting diode can be provided by a transistor controlled by a control unit which receives the turning signal, in particular coming from a steering-wheel sensor.

The invention consists, apart from the provisions disclosed above, of a certain number of other provisions which will be dealt with more explicitly below with regard to example embodiments described with reference to the accompanying drawings, but which are in no way limiting. In these drawings:

DESCRIPTION OF THE PREFERRED EMBODIMENTS

Figure 1:
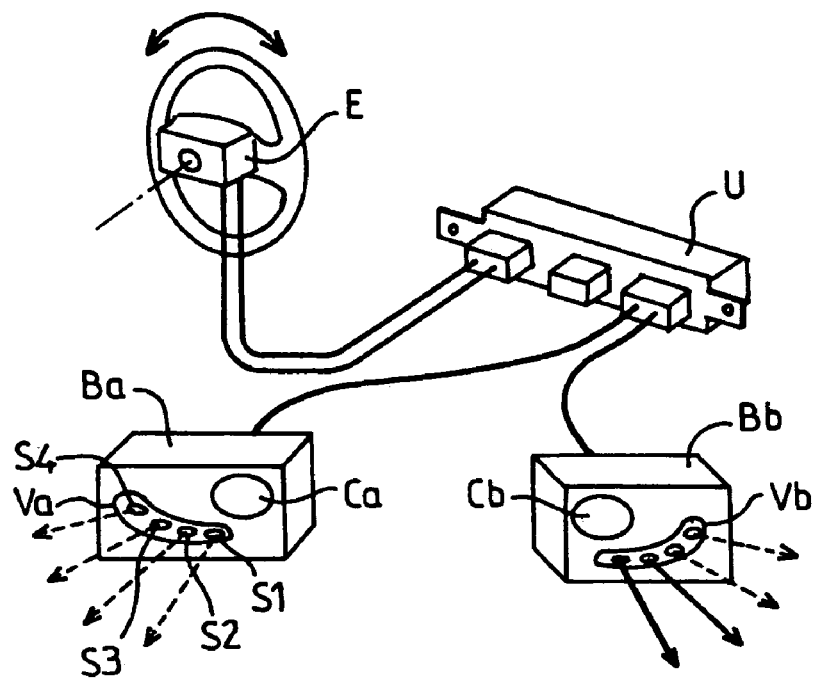
FIG. 1 is a diagram in perspective of a lighting installation on a vehicle comprising two fixed lights for bends according to the invention.

Referring to FIG. 1 of the drawings, part of a lighting installation can be seen, on a motor vehicle, which comprises on each side, at the front of the vehicle, a fixed light for bends Va situated to the right and Vb situated to the left. The light for bends can be housed in the same housing Ba, Bb as the corresponding dipped headlight Ca, Cb. Each housing is connected by a multiconductor cable to a control unit U.

Means sensitive to the path of the vehicle comprise a steering-wheel sensor E and supply to the unit U a signal depending on the nature of the road being followed by the vehicle.

Figure 2:
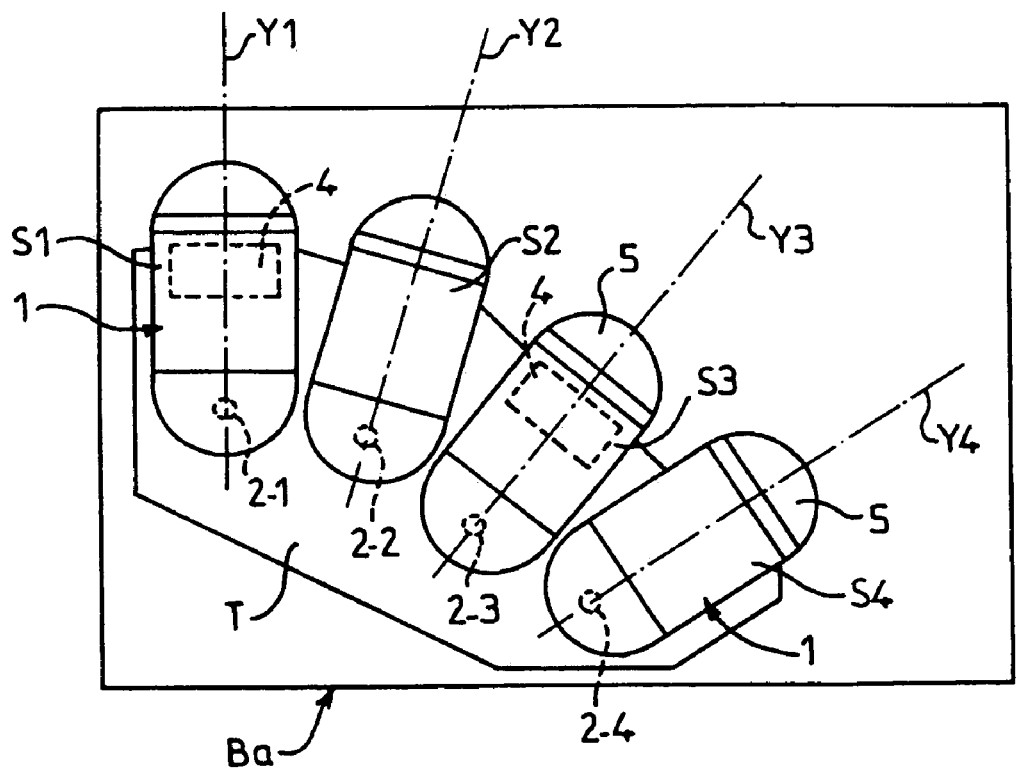
FIG. 2 is a schematic plan view to a larger scale of the light situated on the right-hand side of the vehicle.

Each fixed light for bends Va, Vb comprises at least two and preferably four light sources S1, S2, S3, S4 shown diagrammatically in FIG. 2 for the light for bends Va.

Each light source advantageously consists of a module 1 (FIG. 3) with light-emitting diode 2. The light sources are mounted on a support T housed in the housing Ba. The light sources S1-S4 are mounted with a possibility of adjustment of their orientation.

Figure 3:
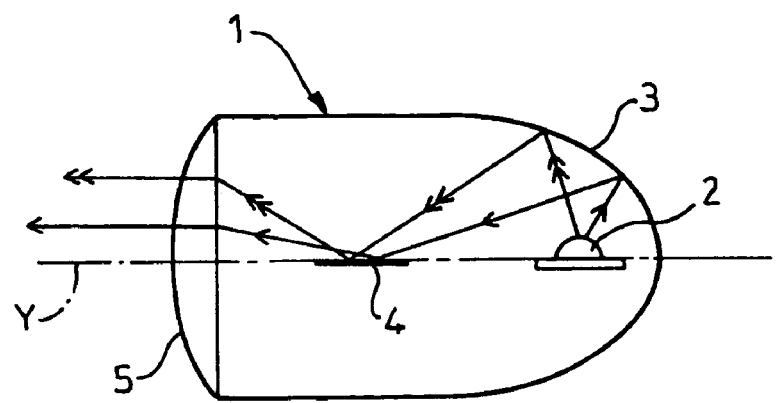
FIG. 3 is a schematic vertical section of an LED module.

Each module 1 comprises a semi-ellipsoidal reflector 3 of optical axis Y. An LED 2 is situated at the inner focus of the reflector 3 and is oriented so that the axis of its light beam is orthogonal to the optical axis Y-Y. The beam returned by the reflector 3 falls on a reflective metallic plate 4, generally referred to as a "folder", which can be flat as illustrated in FIG. 3, or bent in the form of a dihedron. The plate 4 is situated at the outer focus of the reflector 3, or close to it. A convergent lens 5 is placed at the exit from the module 1. According to the form of the folder 4, the module 1 can give a beam with a flat cutoff or a V-shaped cutoff. In the application in question, the light beam obtained is preferably with a flat cutoff, the illuminated part being situated below a horizontal line.

The unit U is designed to control progressive switching on of the sources S1-S4 according to the signal delivered by the steering-wheel sensor E and provide a light sweeping effect with travel of the light beam and following of the bend.

The source S1 situated to the left of the assembly illuminates less than the others to the right, that is to say towards the inside of a right-hand bend. S1 is switched on first, then the source S2, the source S3, the source S4. The preceding source in the order of switching on preferably remains switched on when the following one is switched on.

The optical axes Y1, Y2, Y3, Y4 of the light sources S1-S4 are oriented more and more towards the right, that is to say towards the inside of the right-hand bend.

In order to increase the scanning effect, the angular opening of the light beams supplied by the light sources S1-S4 can increase from S1 to 54. The beam angle of the beam of S4 can attain 40°.

Figure 4:
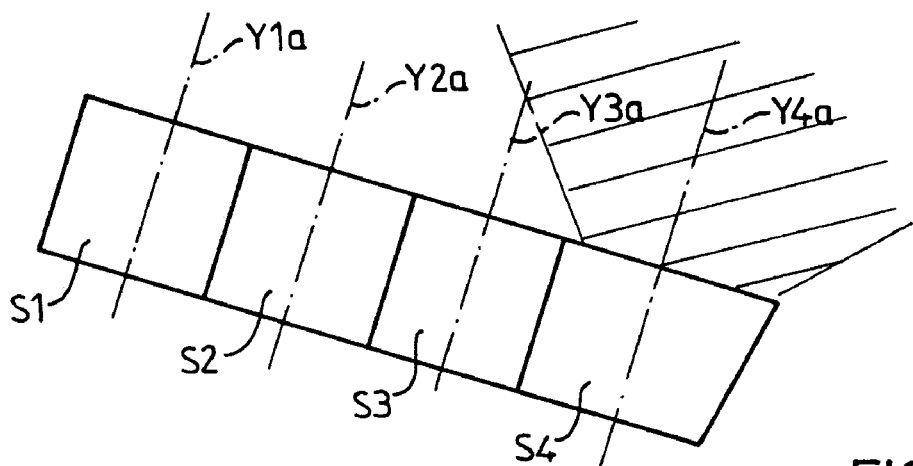
FIG. 4 is a diagram of a variant arrangement of the LED modules.

In a variant, as illustrated in FIG. 4, the optical axes Y1a-Y4a of the modules are parallel to each other but inclined to the right with respect to the longitudinal axis of the vehicle. In this case, preferably, the angular opening of the light beams increases from S1 towards S4.

Figure 6:
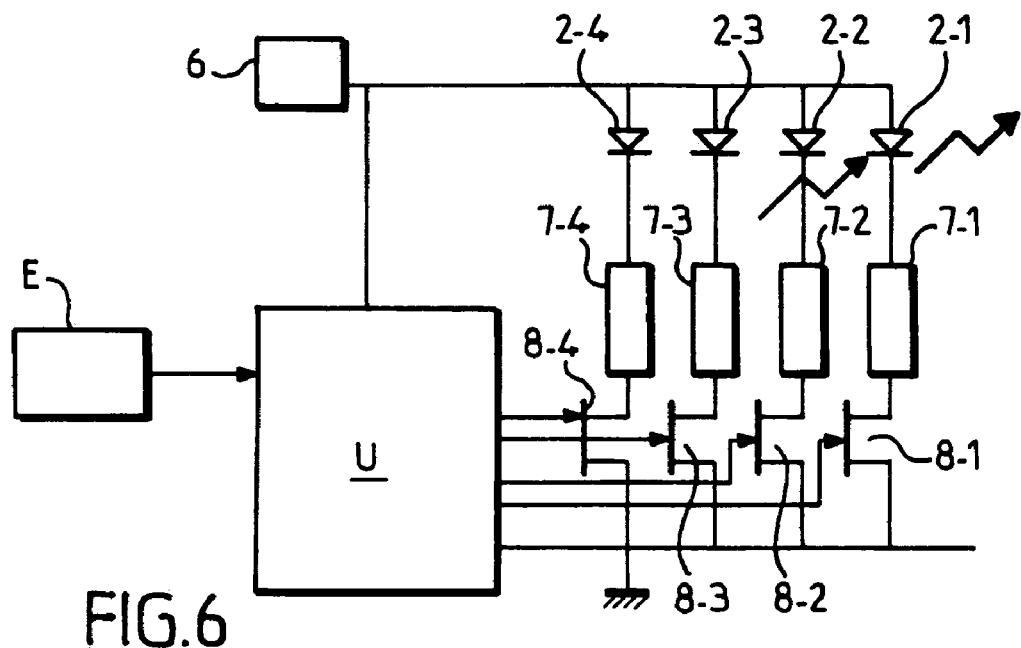
FIG. 6 is a diagram of a circuit controlling the light sources.

FIG. 6 illustrates a control diagram for the light-emitting diodes 2.1 to 2.4. The anodes of the diodes are connected in parallel to the + terminal of a DC voltage source 6, for example at 12 V. The cathodes of the diodes are connected by means of a ballast resistor 7.1 to 7.4 to an electrode of a power transistor 8.1 to 8.4, another electrode of which is connected to earth. The control electrode of the transistor is connected to an output of the control unit U, an input terminal of which receives the signal supplied by the steering-wheel sensor E.

The control unit U can receive the information signal on the path of the vehicle from means other than the steering-wheel sensor, for example from a GPS navigator or a camera analyzing the road in front of the vehicle, or other equivalent devices.

Figure 7:
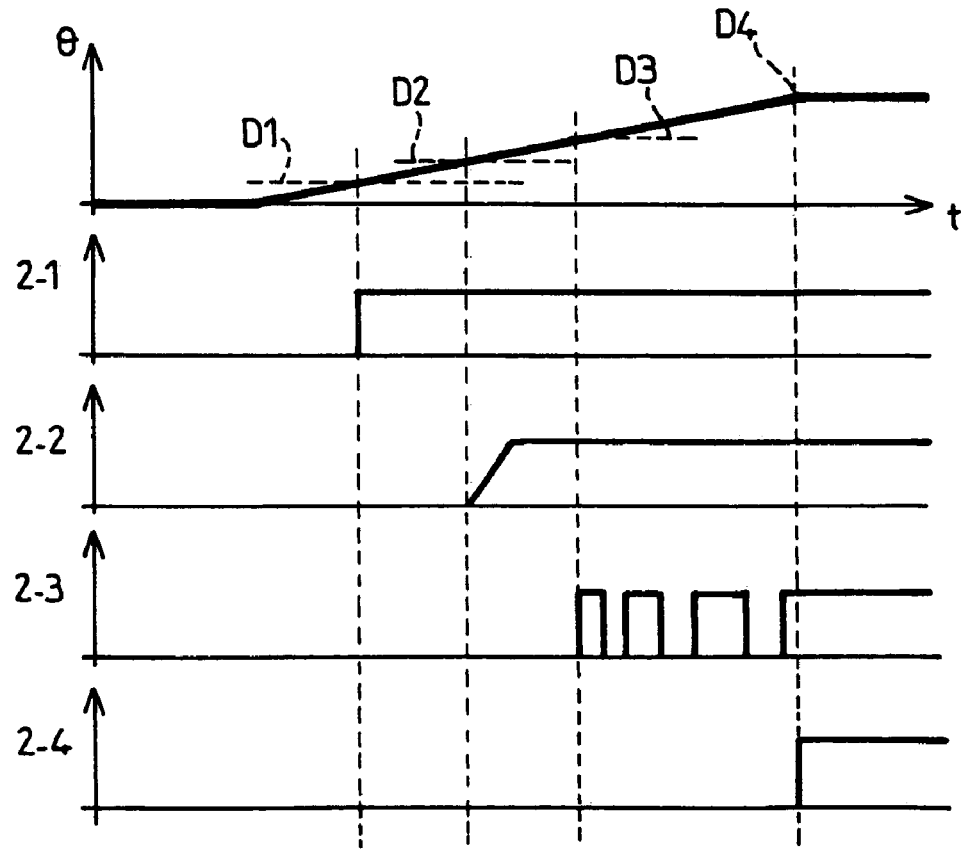
FIG. 7 is a diagram with several lines, illustrating various methods of controlling the switching on of the LEDs.

The power transistors 8.1 to 8.4 can be controlled in two-state mode as illustrated in FIG. 7 on the second and last line for the LEDs 2.1 and 2.4. In a variant, the power transistors are controlled in analogue or modulated voltage as described below with regard to the LEDs 2.2 and 2.3.

The first line of FIG. 7 illustrates the variation in the angle of rotation θ of the steering wheel entered on the Y axis as a function of the time t entered on the X axis, when the vehicle is going round the bend. The switching on of the first LED 2.1 is demanded when the turning angle reaches a first threshold D1. The second LED 2.2 is switched on when the turning angle reaches a second threshold D2. In the example in FIG. 7, the switching of the LED 2.2 is effected in accordance with an analogue linear modulation represented by an inclined ramp before reaching the maximum level.

The third LED 2.3 is switched on when the turning angle reaches a third threshold D3. In the example in FIG. 7, the switching on of this LED is effected in accordance with a pulse width modulation (PWM). The pulses become greater and greater in order to reach a maximum value corresponding to a continuous supply, according to the increase in the turning angle.

Figure 5:
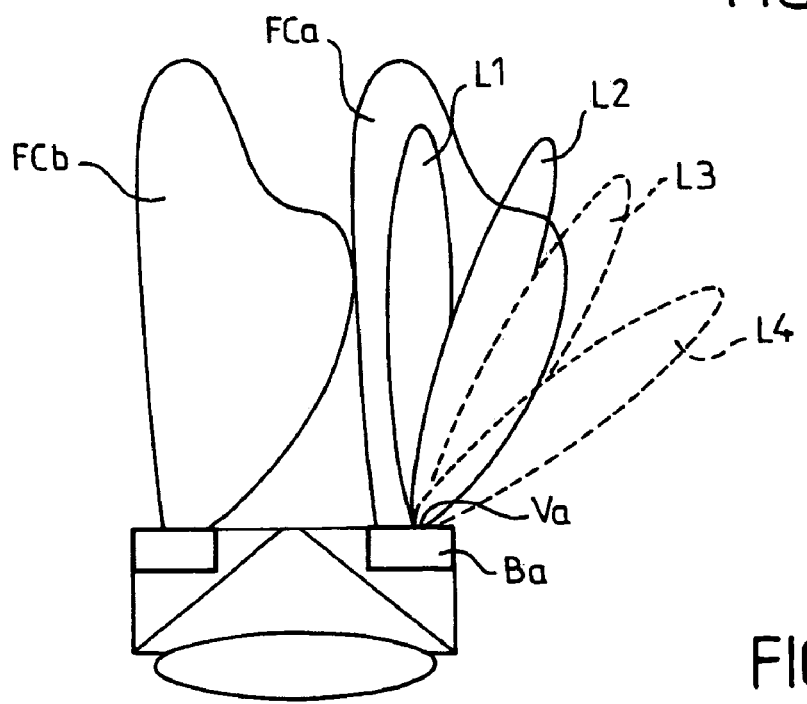
FIG. 5 is a schematic plan view of the front of the vehicle equipped with lights according to the invention.

The diagram of FIG. 5 illustrates the travel of the beam by modulation of each light source S1-S4.

The diagram of FIG. 5 illustrates the travel of the beam by modulation of each LED module S1-S4.

The main dipped beams FCa, FCb are shown, the two dipped headlights being switched on.

When the vehicle goes round a bend to the right, the light source S1 is switched on first and produces a beam L1, for example with its axis parallel to that of the vehicle. Then, according to the turning angle, the successive light sources S2, S3, S4 are switched on, without switching off of the previous modules, so that beams L2, L3, L4 are obtained which are more and more inclined towards the right, that is to say towards the inside of the bend.

The light sources of the fixed light for bends situated on the left remain switched off during a bend to the right. During a bend to the left, the left-hand fixed light for bends is switched on, whilst the right-hand fixed light for bends remains switched off.

The progressive switching on of the light-emitting diodes 2.1-2.4, according to the angle of the steering wheel, gives a sweep effect equivalent to a beam rotation, without for all that using any moving mechanical parts.

Although the number of four light sources is advantageous for producing a spectacular sweep effect, without giving rise to an excessive increase in the cost price, it is possible to reduce the cost by being limited to two light sources whose successive switching on does create a sweeping effect.

The light-emitting diodes allow a modulation of light intensity without substantial shift in the color of the light, unlike a modulated halogen lamp, which emits a light which appears more and more white when the supply voltage increases.

Such a halogen lamp, combined with a discharge lamp producing a bluish-white light, seems to become reddish when its supply voltage increases.

What is claimed is:

1. A fixed light for a vehicle for generating a light beam for bends, the light comprising:
   at least two light-emitting diode modules, each of the modules comprising a semi-ellipsoidal reflector defining a reflector optical axis, a light emitting diode situated at an inner focus of the reflector and defining a light beam axis orthogonal to the reflector optical axis, and a plate disposed to receive at least a portion of the light beam reflected by the reflector;
   a sensor configured to sense a path of the vehicle and to supply a signal dependent on the path of the vehicle; and
   a controller adapted to selectively switch on the light emitting diodes in accordance with the signal provided by the sensor, and is configured to provide a light beam that sweeps in a predetermined direction.

2. A fixed light according to claim 1, wherein the light beam axes are parallel to each other.

3. A fixed light according to claim 2, wherein an angular opening of the light beam of the light-emitting diode modules increases in a direction in accordance with an order of switching on of the light-emitting diode modules.

4. A fixed light according to claim 1, wherein a beam angle of the light beam of the light-emitting diode modules increases in a direction in accordance with an order of switching on of the light-emitting diode modules.

5. A fixed light according to claim 1, wherein the plate is situated at an outer focus of the reflector.

6. A fixed light according to claim 1, wherein the plate is bent in the form of a dihedron.

7. A fixed light according to claim 1, wherein the controller is adapted to switch on the light-emitting diode modules with a pulse width modulated signal.

8. A fixed light according to claim 1, wherein the sensor comprises a camera adapted to analyze a road in front of the vehicle.

9. A motor vehicle comprising at least one fixed light according to claim 1.

* * * * *